Patented Feb. 17, 1925.

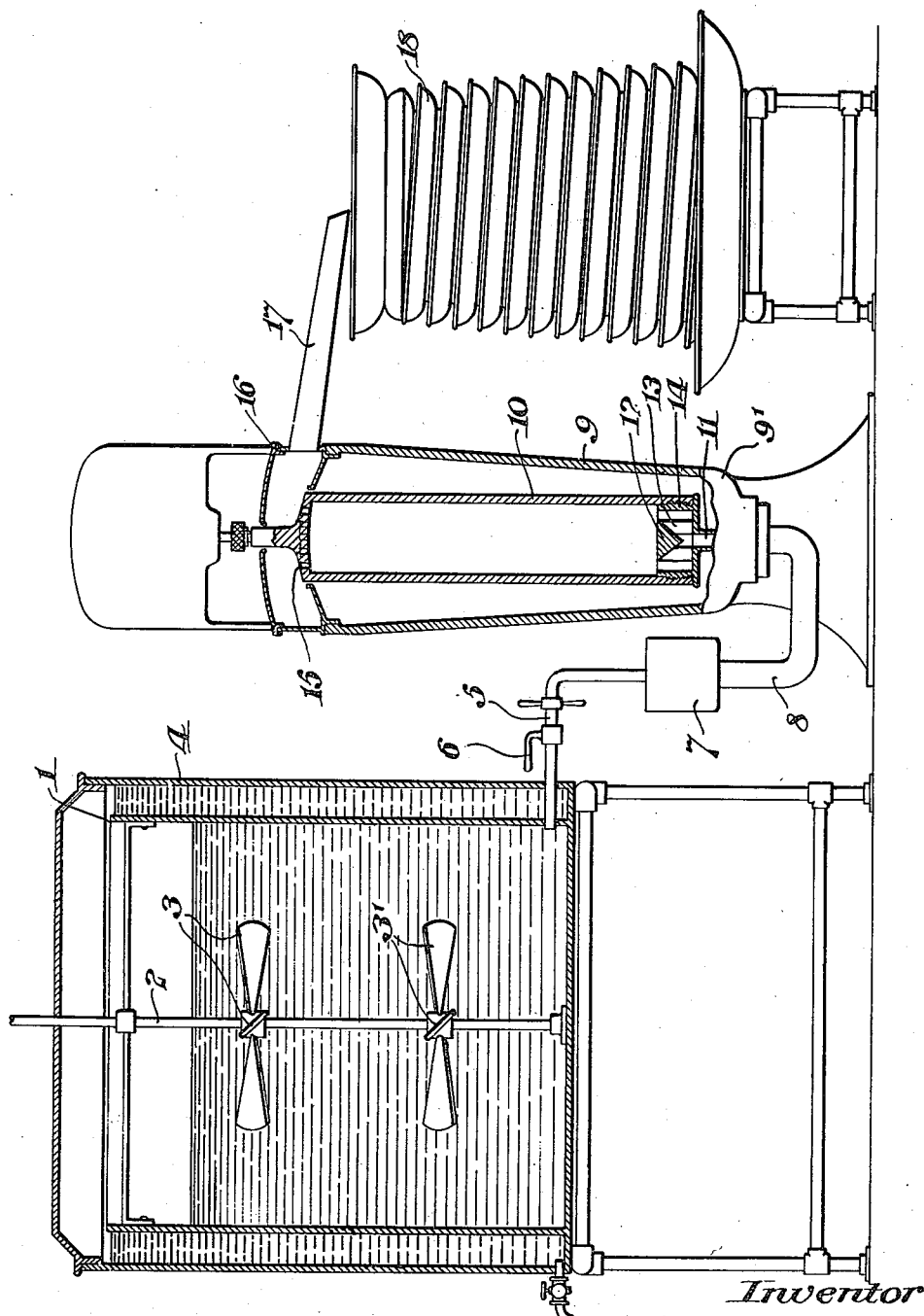

1,526,465

UNITED STATES PATENT OFFICE.

WALTER GRANT DIXON, OF WEST CHESTER, PENNSYLVANIA, ASSIGNOR TO SHARPLES SEPARATOR COMPANY, OF WEST CHESTER, PENNSYLVANIA, A CORPORATION OF PENNSYLVANIA.

PROCESS OF PRODUCING EMULSIONS.

Application filed January 3, 1920. Serial No. 349,301.

*To all whom it may concern:*

Be it known that I, WALTER GRANT DIXON, a citizen of the United States, residing at West Chester, in the county of Chester and State of Pennsylvania, have invented an Improved Process of Producing Emulsions, of which the following is a specification.

My improvements are designed primarily for the production of milk and cream from the several constituents which may be used therefor, but they are not limited to such uses, as they are applicable to the production of emulsions of various characters by the combination of various constituents of which they are formed.

The primary object of my improvements is to produce emulsions that are smooth and stable, of fine texture, taste and keeping qualities, by means that are simple and efficient.

This object is attained, as in the combination of skimmed milk powder with water and at fatty substance for the production of milk or the combination of milk with butter for the production of cream or the combination of milk products with sugar and gelatine for making ice cream, by heating and stirring the mixed ingredients, emulsifying the product by centrifugal force and cooling the product of emulsification.

In practicing the process, in its preferred form, the mixed ingredients are continuously agitated vigorously and heated, at a temperature of about 180° Fahrenheit for say a half hour, until they are thoroughly dissolved; the heated and dissolved product is passed through a centrifugal machine adapted for effecting emulsification in its bottom and discharging the emulsified product from its top in the form of a vapor, and this emulsified producet is chilled by passing it over a cooling surface.

While a temperature of 160° Fahrenheit is generally considered the limit to which milk or a milk product may be heated without producing a burnt or cooked taste, I have found that by maintaining constant agitation a temperature of about 180° Fahrenheit may be used during the time required for effecting thorough dissolution with the result that the product is fine in texture, taste and keeping qualities.

When the ingredients have been sufficiently heated and agitated, they are run directly into a centrifugal machine, preferably of the tubular type with a bottom inlet in combination with a spreader and wings by which the inflowing liquid is thrown directly against the inner surface of the bottom of the bowl and revolved therein, rising in a thin film up the wall of the bowl to outlets through which it is discharged in the form of a vapor into a receiving vessel, whence it is discharged over a cooling surface.

The drawing is a part sectional elevation of a form of apparatus adapted for the practice of my improvements.

The apparatus illustrated in the drawing comprises a reservoir 1, containing the revoluble shaft 2 with the propeller blades 3 thereon for agitating the contents, and a surrounding chamber 4 for holding a heating fluid to bring the contents of the vessel to the desired temperature preferably from 175° to 180° Fahrenheit in the case of a milk product.

The reservoir 1 discharges through a conduit 5 under control of a valve 6 to a cup 7 which discharges by a conduit 8 through the bottom of the centrifuge case 9 into a revoluble bowl 10 through the axial bottom inlets 11 thereof. The bowl has in the bottom thereof above the inlet a spreader 12 and wings 13 radiating therefrom toward the inner surface of the bottom 14 which portion of the bowl wall projects inwardly toward the central axis of the bowl.

The top of the bowl is provided with a number of discharge outlets 15 sufficient in number to permit the free discharge of the contents of the bowl to the pan 16 supported by the case 9 and surrounding the top of the bowl. The outlets 15 are located substantially in the peripheral plane of the inwardly projecting wall portion 14, and are of such size and number, that when the bowl is rotated the liquid is sucked into the bottom of the rotating bowl and is thrown by centrifugal force outwardly and impacted violently against the relatively hard, imperforate, inner wall portion 14 at which point the emulsification occurs. Under the centrifugal force generated by the rotating bowl, the emulsified liquid is immediately thrown along this inner wall portion 14 and thence to travel along the outer portion of the remaining bowl wall 10.

Immediately upon striking the travelling wall 14 of the rotating bowl, this emulsed liquid is centrifuged along this surface 14 and thence travels along the remaining relatively outwardly projecting wall of the bowl 10 until it reaches the discharge outlets 15 from which it is ejected. By reason of the location of the inner wall portion 14, the outwardly projecting wall of the bowl 10 and the disposition of the discharge outlets 15 in the plane of the wall 14, the liquid in travelling from the point of impact on the inner wall portion 14 to the discharge outlets 15, forms itself as a film on the bowl wall only along the relatively outwardly extending portions of the bowl; that is, from the upper end of the inwardly projecting wall portion 14 to the discharge holes 15. In this manner, and by reason of this construction, the relatively hard imperforate wall portion 14 is maintained free of the milk cushion so that the desired rupture of the milk globules and constituents is assured. Furthermore, in filming upwardly along the upper portion of the bowl 10, any undissolved foreign substance in the emulsified liquid will cling to the vertical wall and thus the emulsion will be clarified.

Upon being discharged from the outlets 15, the emulsion is delivered into the pan 16 in the form of a vapor and is discharged through spout 17 to the cooler 18 over the surface of which the emulsion flows and by which it is chilled.

Having described my invention, I claim:

1. The method of emulsifying liquids which consists in centrifuging the liquid against an imperforate wall and centrifuging said impacted liquid away from said zone of impact to prevent the formation of a milk cushion thereon.

2. The method of emulsifying liquid consisting in centrifuging the liquid against an annular imperforate wall, centrifuging said impacted liquid along said wall and discharging said liquid from the peripheral plane of said wall.

3. The method of emulsifying liquids consisting in centrifuging the liquid against the imperforate rotating wall of a centrifugal bowl and discharging the liquid from said bowl in substantially the plane of the imperforate wall against which the liquid was centrifuged.

4. The method of emulsifying liquids which consists in centrifuging the liquid against the imperforate rotating wall of a rotating centrifugal bowl and ejecting said liquid from said bowl through openings located substantially in the peripheral plane of the imperforate wall.

5. The method of emulsifying liquids which consists in centrifuging the liquid against an inwardly projecting imperforate wall portion of a centrifugal bowl and ejecting said emulsified liquid from said bowl at a point removed from the zone of impact and in substantially the peripheral plane of said inwardly projecting wall portion so that the emulsified liquid is caused to travel in a thin film along the inner surface of said bowl to clarify said liquid without forming a milk cushion on said inwardly projecting wall portion.

In testimony whereof I have hereunto set my name this 30th day of December, 1919.

WALTER GRANT DIXON.